United States Patent

Morikawa et al.

[11] Patent Number: 5,366,682
[45] Date of Patent: Nov. 22, 1994

[54] PROCESS FOR PRODUCING PHASE RETARDER

[75] Inventors: Michitaka Morikawa, Ibaraki; Koji Higashi, Takatsuki; Tadashi Shindo, Toyonaka, all of Japan

[73] Assignee: Sumitomo Chemical Company, Limited, Osaka, Japan

[21] Appl. No.: 987,803

[22] Filed: Dec. 9, 1992

[30] Foreign Application Priority Data

Dec. 9, 1991 [JP] Japan ................. 3-324644

[51] Int. Cl.⁵ ........................... B29C 61/02
[52] U.S. Cl. ................... 264/230; 264/1.34; 264/289.6; 264/342 R; 264/DIG. 71
[58] Field of Search ........... 264/230, 289.6, 342 R, 264/342 RE, DIG. 71, 1.3

[56] References Cited

U.S. PATENT DOCUMENTS

| | | | |
|---|---|---|---|
| 3,445,561 | 5/1969 | Huff et al. | 264/342 RE |
| 3,577,510 | 5/1971 | Schmitz et al. | 264/342 RE |
| 4,160,799 | 7/1979 | Locey et al. | 264/230 |
| 5,061,042 | 10/1991 | Nakamura et al. | 359/63 |
| 5,235,450 | 8/1993 | Yoshimura et al. | 359/63 |
| 5,244,713 | 9/1993 | Nakamura et al. | 428/156 |

FOREIGN PATENT DOCUMENTS

| | | | |
|---|---|---|---|
| 0482620 | 4/1992 | European Pat. Off. | |
| 61-167531 | 7/1986 | Japan | 264/230 |
| 2089006 | 3/1990 | Japan | |
| 2160204 | 6/1990 | Japan | |
| 2191904 | 7/1990 | Japan | |
| 2285303 | 11/1990 | Japan | |

OTHER PUBLICATIONS

Database WPIL, Week 9019, Derwent Publications Ltd., London, GB; AN 90-143316.

*Primary Examiner*—Jeffrey R. Thurlow
*Attorney, Agent, or Firm*—Sughrue, Mion, Zinn, Macpeak & Seas

[57] ABSTRACT

A process for producing a phase retarder film or sheet, which comprises subjecting a stretched thermoplastic resin film or sheet to thermal relaxation at a temperature not lower than the glass transition temperature of the thermoplastic resin to shrink the film or sheet in the stretching axis direction while suppressing the expansion of the film or sheet in a direction parallel to the film or sheet surface and perpendicular to the stretching axis.

14 Claims, No Drawings

PROCESS FOR PRODUCING PHASE RETARDER

BACKGROUND OF THE INVENTION

1. Field of the Invention

The present invention relates to a process for producing a phase retarder film or sheet used in liquid crystal display devices, etc.

2. Description of the Related Art

Phase retarder films or sheets each comprising a uniaxially oriented thermoplastic resin film or sheet have been used as optical compensators to enhance display qualities of liquid crystal display devices.

A STN type liquid crystal display device using such phase retarder films or sheets as optical compensators is advantageous in that it is lighter in weight, thinner and less expensive, but disadvantageous in that it has a narrow viewing angle characteristic and exhibits a low contrast ratio as compared with a STN double cell type liquid crystal display device using a liquid crystal cell as optical compensator. These disadvantages have been considerably eliminated by, for example, laminating two plies of phase retarder films or sheets, but the viewing angle characteristic has not reached a satisfactory level.

The viewing angle characteristic of a liquid crystal display device using phase retarders as optical compensators greatly depends not only upon the angular dependence of the birefringence of the liquid crystal cell used therein but also upon the angular dependence of the birefringence (i.e. retardation) of the phase retarder. In conventional phase retarders, it is known that lower angular dependence of retardation gives a superior result. The angular dependence of retardation of a phase retarder film or sheet is expressed by a retardation ratio $R_{40}/R_0$. In this case, the retardation $R_{40}$ is a value measured with the phase retarder film or sheet being tilted by 40° from the horizontal condition by rotating around an axis which corresponds to the slow axis if the phase retarder consists of a thermoplastic resin having a positive intrinsic birefringence, or to the fast axis if the phase retarder consists of a thermoplastic resin having a negative intrinsic birefringence; the retardation $R_0$ is a value measured with the phase retarder film or sheet not being tilted (i.e. arranged horizontally); and the measurement is made using a polarizing microscope equipped with a Sénarmont compensator. As the retardation ratio of a phase retarder is closer to 1, its angular dependence of retardation is lower.

In order to reduce the angular dependence of retardation of a phase retarder film or sheet, the following methods have, for example, been proposed.

A method of stretching a film whose molecules are orientated in a direction normal to the film surface [Japanese Patent Kokai (Laid-open) No. 2-160204].

A method of shrinking a film in a direction perpendicular to the stretching axis at the time of the uniaxial stretching [Japanese Patent Kokai (Laid-open) No. 2-191904].

A method of stretching a film produced from a molten polymer or a polymer solution under an electric field applied [Japanese Patent Kokai (Laid-open) No. 2-285303]. None of these methods, however, is sufficient in mass production.

SUMMARY OF THE INVENTION

The present inventors made an extensive study in order to solve the above problems. As a result, the present inventors found that a phase retarder film or sheet having a low angular dependence of retardation can be produced by subjecting a stretched thermoplastic resin film or sheet to thermal relaxation to shrink the film or sheet in the stretching axis direction while suppressing the expansion of the film or sheet in a direction parallel to the film or sheet surface and perpendicular to the stretching axis. The finding has led to the completion of the present invention.

PREFERRED EMBODIMENTS OF THE INVENTION

A stretched thermoplastic resin film or sheet shrinks in the stretching direction when it is subjected to thermal relaxation in an unrestricted condition at a temperature not lower than the glass transition temperature of the thermoplastic resin. During this thermal relaxation, the film or sheet tends to expand in a direction parallel to the film or sheet surface and perpendicular to the stretching axis, because the film or sheet has a neck-in (shrinkage) generated during the stretching, in the direction parallel to the film or sheet surface and perpendicular to the stretching axis.

When a stretched film or sheet is subjected to thermal relaxation while suppressing its expansion (length increase) in a direction parallel to the film or sheet surface and perpendicular to the stretching axis, to a length smaller than that obtained in an unrestricted condition, the length in the stretching axis direction shrinks and thickness of the film or sheet expands and exhibits improved angular dependence of retardation.

Herein, the stretching axis refers to an axis of uniaxial stretching in the case of uniaxial stretching, and to an axis of main stretching in the case of unbalanced biaxial stretching.

"Perpendicular to stretching axis" refers to 60°–120° to stretching axis. Suppression of expansion in a direction of, in particular, 85°–95° to stretching axis is preferable in view of the improvement in angular dependence of retardation. Suppression of expansion in a direction parallel to the film or sheet surface and perpendicular to the stretching axis, as compared with the suppression in other directions, gives higher improvement in angular dependence of retardation.

"Suppression of expansion in a direction parallel to the film or sheet surface and perpendicular to the stretching axis" refers to keeping the expansion in said direction substantially at 0, i.e. keeping constant the length of the film or sheet in said direction and further making the expansion in said direction smaller than the level obtained when the film or sheet is subjected to thermal relaxation in an unrestricted condition until a desired $R_0$ value is attained.

The method for suppressing the expansion of a stretched film or sheet in a direction parallel to the film or sheet surface and perpendicular to the stretching axis, during the thermal relaxation, is not critical. The method includes, for example, the following.

(1) A method of contacting a film or sheet with a plate (e.g. a hot plate) and utilizing the frictional force generated by the contact, for suppression of the expansion of the film or sheet in a direction parallel to the film or sheet surface and perpendicular to the stretching axis.

(2) A method of arranging a film or sheet between a pair of parallel walls having a given distance between them, in such a manner that the film or sheet surface becomes perpendicular to the walls and the stretching axis of the film or sheet becomes parallel to the walls and thereby suppressing the expansion of the film or sheet in a direction parallel to the film or sheet surface and perpendicular to the stretching axis, to a length not larger than the distance between the walls.

(3) A method of arranging a film or sheet in a frame having a structure in which the film or sheet is not allowed to expand in a direction parallel to the film or sheet surface and perpendicular to the stretching axis and thereby suppressing the expansion of the film or sheet in said direction.

Among these methods, there is preferred the methods (2) and (3).

Thus, by subjecting a film or sheet to thermal relaxation while suppressing the expansion in a direction parallel to the film or sheet surface and perpendicular to the stretching axis, there can be easily obtained a thermoplastic resin film or sheet satisfying the following formula.

$$0.900 < R_{40}/R_0 < 1.100$$

Wrinkles may be generated when a film or sheet is subjected to thermal relaxation while suppressing the expansion in a direction parallel to the film or sheet surface and perpendicular to the stretching axis. In such cases, the thermal relaxation is preferably conducted while applying an appropriate pressure to the film or sheet surface.

The method for conducting the thermal relaxation while applying an appropriate pressure perpendicularly to the film or sheet surface, is not critical. It can be any method as long as the heating of and the pressure application to the film or sheet can be conducted simultaneously. Such a method includes, for example, the following.

(1) A method which comprises arranging a film or sheet in a frame having a structure in which the film or sheet is not allowed to stretch in a direction parallel to the film or sheet surface and perpendicular to the stretching axis, mounting a weight having the same bottom surface shape as the film or sheet surface, on the film or sheet, and conducting the thermal relaxation of the film or sheet while applying a pressure to the film or sheet surface.

(2) A method which comprises interposing a film or sheet between releasable films, tightly wind them around a cylindrical material so that the direction parallel to the film or sheet surface and perpendicular to the stretching axis of the film or sheet becomes the same as the circumferential direction of the cylindrical material, to apply a pressure uniformly to the film or sheet surface, and conducting the thermal relaxation of the film or sheet under a condition that both ends of the film or sheet are fixed so as not to allow the expansion of the film or sheet in a direction parallel to the film or sheet surface and perpendicular to the stretching axis.

By subjecting a stretched thermoplastic resin film or sheet to thermal relaxation while applying a pressure thereto so that no wrinkle is generated in the film or sheet and there occurs increase of film or sheet thickness, there can be obtained a thermoplastic sheet or film satisfying the following formula and having no wrinkles.

$$0.900 < R_{40}/R_0 < 1.100$$

A pressure of 0.1 g/cm$^2$ to 10 kg/cm$^2$ is generally applied in view of the uniformity of the film or sheet after thermal relaxation and the relaxation rate.

The stretched thermoplastic resin film or sheet has no restriction as to its orientation as long as it can, during the thermal relaxation, shrink in the stretching axis direction and expand in a direction parallel to the film or sheet surface and perpendicular to the stretching axis.

The production of such a film or sheet is not critical. It can be produced, for example, by preparing an unstretched film or sheet by a known method such as solution casting, press molding, extrusion or the like and then stretching the unstretched film or sheet by a known method such as tentering, stretching between rolls, rolling or the like.

In view of, for example, the molecular orientation in film or sheet thickness direction during thermal relaxation and the uniformity of in-plane retardation of film or sheet, it is preferred that a film or sheet be prepared by solution casting and then subjected to longitudinal uniaxial stretching between rolls.

The temperature at which the stretched thermoplastic resin film or sheet is relaxed thermally, can be any temperature if it is not lower than the glass transition temperature (Tg) of the thermoplastic resin and lower than the melting point (Tm) and enables the thermal relaxation of the thermoplastic resin film or sheet. The temperature of thermal relaxation varies depending upon the Tg and Tm of the resin used, but is preferably in the range of Tg to (Tg+50° C.) in view of, for example, the control of in-plane retardation and the molecular orientation in thickness direction.

In conducting the thermal relaxation of a stretched thermoplastic resin film or sheet while applying a pressure to the film or sheet surface, a cushioning medium may be used in order to reduce the unevennesses in temperature, pressure, etc. The use enables the uniform transfer of temperature and pressure to the film or sheet via the cushioning medium.

It is also possible to interpose a stretched thermoplastic resin film or sheet between releasable materials (e.g. releasable polyester films) or to coat the surface of said film or sheet with a lubricant (e.g. silicone oil or molten surfactant), in order to enhance the transformation rate or uniformity in transformation rate, of said film or sheet during the thermal relaxation.

The thermoplastic resin used for preparation of a stretched thermoplastic resin film or sheet is not critical as long as it has intrinsic birefringence. However, it preferably has excellent optical properties (e.g. excellent transparency).

As the thermoplastic resin, there can be used, for example, thermoplastic resins having positive intrinsic birefringence, such as polycarbonate, polysulfone, polyarylate, polyethersulfone, cellulose diacetate and the like, and thermoplastic resins having negative intrinsic birefringence, such as polystyrene, α-methylpolystyrene, polyvinylpyridine, polyvinylnaphthalene, polymethyl methacrylate and the like. Of these, a polycarbonate is preferred in view of the transparency, heat and humidity resistance, expression of birefringence, etc.

The present invention enables easy industrial production of a phase retarder low in angular dependence of retardation. A liquid crystal display device having the phase retarder(s) mounted thereon shows a significantly improved viewing angle characteristic.

The present invention is hereinafter described in detail. However, the present invention is by no means restricted to them.

EXAMPLE 1

A polycarbonate film of 185 μm in thickness, obtained by solvent casting was stretched to a 2.1-fold length at 184° C. by longitudinal uniaxial stretching to obtain a stretched film of thickness=98 μm, $R_0$=867 nm and $R_{40}/R_0$=1.108. The stretched film was cut into a size of 9.9 cm (direction perpendicular to stretching axis)×2.4 cm (stretching axis direction), and the cut film was placed in a frame having such a structure in which the cut film was not allowed to expand in a direction parallel to the film surface and perpendicular to the stretching axis. On the cut film in the frame was mounted a weight having the same bottom surface shape as the cut film shape, to apply a pressure of 70 g/cm² uniformly on the film surface in a direction perpendicular to the film surface. Under this condition, the stretched film was subjected to thermal relaxation at 165° C. for 120 minutes while suppressing the expansion of the film in a direction parallel to the film surface and having an angle of 90° to the stretching axis of the film. As a result, there was obtained a phase retarder film of size=9.9 cm (direction perpendicular to stretching axis)×2.0 cm (stretching axis direction), thickness=120 μm, $R_0$=445 nm, and $R_{40}/R_0$=1.000.

EXAMPLE 2

The same stretched film as in Example 1 was cut into a size of 9.9 cm (direction perpendicular to stretching axis)×2.4 cm (stretching axis direction), and the cut film was placed in a frame having such a structure in which the cut film was not allowed to expand in a direction parallel to the film surface and perpendicular to the stretching axis. On the cut film in the frame was mounted a weight having the same bottom surface shape as the cut film shape, to apply a pressure of 235 g/cm² uniformly on the film surface in a direction perpendicular to the film surface. Under this condition, the stretched film was subjected to thermal relaxation at 165° C. for 180 minutes while suppressing the expansion of the film in a direction parallel to the film surface and having an angle of 90° to the stretching axis of the film. As a result, there was obtained a phase retarder film of size=9.9 cm (direction perpendicular to stretching axis)×2.1 cm (stretching axis direction), thickness=118 μm, $R_0$=586 nm, and $R_{40}/R_0$=1.047.

EXAMPLE 3

The same stretched film as in Example 1 was cut into a size of 9.9 cm (direction perpendicular to stretching axis)×2.4 cm (stretching axis direction), and the cut film was placed in a frame having such a structure in which the cut film was not allowed to expand in a direction parallel to the film surface and perpendicular to the stretching axis. On the cut film in the frame was mounted a weight having the same bottom surface shape as the cut film shape, to apply a pressure of 87 g/cm² uniformly on the film surface in a direction perpendicular to the film surface. Under this condition, the stretched film was subjected to thermal relaxation at 170° C. for 120 minutes while suppressing the expansion of the film in a direction parallel to the film surface and having an angle of 90° to the stretching axis of the film. As a result, there was obtained a phase retarder film of size=9.9 cm (direction perpendicular to stretching axis)×2.1 cm (stretching axis direction), thickness=122 μm, $R_0$=519 nm, and $R_{40}/R_0$=1.059.

EXAMPLE 4

A polycarbonate film of 200 μm in thickness, obtained by solvent casting was stretched to a 1.1-fold length at 190° C. by longitudinal uniaxial stretching to obtain a stretched film of thickness=187 μm, $R_0$=613 nm and $R_{40}/R_0$=1.124. The stretched film was cut into a size of 9.9 cm (direction perpendicular to stretching axis)×2.4 cm (stretching axis direction), and the cut film was placed in a frame having such a structure in which the cut film was not allowed to expand in a direction parallel to the film surface and perpendicular to the stretching axis. On the cut film in the frame was mounted a weight having the same bottom surface shape as the cut film shape, to apply a pressure of 63 g/cm² uniformly on the film surface in a direction perpendicular to the film surface. Under this condition, the stretched film was subjected to thermal relaxation at 165° C. for 120 minutes while suppressing the expansion of the film in a direction parallel to the film surface and having an angle of 90° to the stretching axis of the film. As a result, there was obtained a phase retarder film of size=9.9 cm (direction perpendicular to stretching axis)×2.2 cm (stretching axis direction), thickness=200 μm, $R_0$=351 nm, and $R_{40}/R_0$=1.035.

EXAMPLE 5

A polycarbonate film of 185 μm in thickness, obtained by solvent casting was stretched to a 1.1-fold length at 178° C. by longitudinal uniaxial stretching to obtain a stretched film of thickness=170 μm, $R_0$=650 nm and $R_{40}/R_0$=1.100. The stretched film was cut into a size of 30 cm (direction perpendicular to stretching axis)×20 cm (stretching axis direction). The cut film was interposed between two same releasable films (Cerapeel Q-1 #188 manufactured by Toyo Metallizing Co., Ltd.). Thereon was mounted a metal plate and a pressure of 4.5 g/cm² was applied uniformly on the film surface in a direction perpendicular to the film surface. Under this condition, the stretched film was subjected to thermal relaxation at 153° C. for 120 minutes while suppressing the expansion of the film in a direction parallel to the film surface and having an angle of 90° to the stretching axis of the film. As a result, there was obtained a phase retarder film of size=30.85 cm (direction perpendicular to stretching axis)×18.8 cm (stretching axis direction), thickness=185 μm, $R_0$=200 nm, and $R_{40}/R_0$=1.063.

EXAMPLE 6

A polycarbonate film of 185 μm in thickness, obtained by solvent casting was stretched by transverse uniaxial stretching to obtain a stretched film of thickness=138 μm, $R_0$=619 nm and $R_{40}/R_0$=1.112. The stretched film was cut into a size of 200 cm (direction perpendicular to stretching axis)×12 cm (stretching axis direction). The cut film was interposed between two same releasable films (200 cm×15 cm) (Cerapeel Q-1 #188 manufactured by Toyo Metallizing Co., Ltd.). The resultant sandwich, together with a cushioning medium (200 cm×15 cm) covered with flannel at the both sides, was tightly wound around an aluminum pipe of 9 cm (diameter)×3 mm (wall thickness). In this case, the polycarbonate film was fixed at the ends to prevent the expansion in a direction parallel to the film surface and perpendicular to the stretching axis. Under this condition, the stretched film was subjected to thermal relaxation at 152° C. for 25 hours while suppressing the expansion of the film in a direction parallel to the film surface and having an angle of 90° to the stretching axis of the film. As a result, there was obtained a phase retarder film of size=200 cm (direction perpendicular to stretching axis)×11.5 cm (stretching axis direction), thickness=158 μm, $R_0$=421 nm, and $R_{40}/R_0$=0.978.

EXAMPLE 7

A polycarbonate film of 185 μm in thickness, obtained by solvent casting was stretched by transverse uniaxial stretching to obtain a stretched film of thickness=148 μm, $R_0$=990 nm and $R_{40}/R_0$=1.167. The stretched film was cut into a size of 200 cm (direction perpendicular to stretching axis)×12 cm (stretching axis direction). The cut film was interposed between two same releasable films (200 cm×15 cm) (Cerapeel Q-1 #188 manufactured by Toyo Metallizing Co., Ltd.). The resultant sandwich, together with a cushioning medium (200 cm×15 cm) covered with flannel at the both sides, was tightly wound around an aluminum pipe of 9 cm (diameter)×3 mm (wall thickness). In this case, the polycarbonate film was fixed at the ends to prevent the expansion in a direction parallel to the film surface and perpendicular to the stretching axis. Under this condition, the stretched film was subjected to thermal relaxation at 153° C. for 25 hours while suppressing the expansion of the film in a direction parallel to the film surface and having an angle of 90° to the stretching axis of the film. As a result, there was obtained a phase retarder film of size=200 cm (direction perpendicular to stretching axis)×10.2 cm (stretching axis direction), thickness=182 μm, $R_0$=467 nm, and $R_{40}/R_0$=1.007.

EXAMPLE 8

A polycarbonate film of 185 μm in thickness, obtained by solvent casting was stretched by transverse uniaxial stretching to obtain a stretched film of thickness=160 μm, $R_0$=1333 nm and $R_{40}/R_0$=1.110. The stretched film was cut into a size of 200 cm (direction perpendicular to stretching axis)×12 cm (stretching axis direction). The cut film was interposed between two same releasable films (200 cm×15 cm) (Cerapeel Q-1 #188 manufactured by Toyo Metallizing Co., Ltd.). The resultant sandwich, together with a cushioning medium (200 cm×15 cm) covered with flannel at the both sides, was tightly wound around an aluminum pipe of 9 cm (diameter)×3 mm (wall thickness). In this case, the polycarbonate film was fixed at the ends to prevent the expansion in a direction parallel to the film surface and perpendicular to the stretching axis. Under this condition, the stretched film was subjected to thermal relaxation at 153° C. for 25 hours while suppressing the expansion of the film in a direction parallel to the film surface and having an angle of 90° to the stretching axis of the film. As a result, there was obtained a phase retarder film of size=200 cm (direction perpendicular to stretching axis)×10.1 cm (stretching axis direction), thickness=198 μm, $R_0$=692 nm, and $R_{40}/R_0$=0.954.

COMPARATIVE EXAMPLE 1

A polycarbonate film of 185 μm in thickness, obtained by solvent casting was stretched to a 2.1-fold length at 190° C. by longitudinal uniaxial stretching. The resultant stretched film had thickness=93 μm, $R_0$=589 nm and $R_{40}/R_0$=1.114.

COMPARATIVE EXAMPLE 2

A polycarbonate film of 185 μm in thickness, obtained solvent casting was stretched by transverse uniaxial stretching to obtain a stretched film of thickness=137 μm, $R_0$=619 nm and $R_{40}/R_0$=1.112. The stretched film was cut into a size of 10 cm (direction perpendicular to stretching axis)×10 cm (stretching axis direction). The cut film was subjected to thermal relaxation at 153° C. for 2 hours on the releasable films (Cerapeel Q-1 #188 manufactured by Toyo Metallizing Co., Ltd.). As a result, there was obtained a phase retarder film of size=10.15 cm (direction perpendicular to stretching axis)×9.65 cm (stretching axis direction), thickness=141 μm, $R_0$=406 nm, and $R_{40}/R_0$=1.109.

COMPARATIVE EXAMPLE 3

A polycarbonate film of 185 μm in thickness, obtained solvent casting was stretched by transverse uniaxial stretching to obtain a stretched film of thickness=160 μm, $R_0$=1333 nm and $R_{40}/R_0$=1.110. The stretched film was cut into a size of 10 cm (direction perpendicular to stretching axis)×10 cm (stretching axis direction). The cut film was subjected to thermal relaxation at 153° C. for 2 hours on the releasable films (Cerapeel Q-1 #188 manufactured by Toyo Metallizing Co., Ltd.). As a result, there was obtained a phase retarder film of size=10.4 cm (direction perpendicular to stretching axis)×9.1 cm (stretching axis direction), thickness=169 μm, $R_0$=621 nm, and $R_{40}/R_0$=1.113.

COMPARATIVE EXAMPLE 4

A polycarbonate film of 185 μm in thickness, obtained solvent casting was stretched by transverse uniaxial stretching to obtain a stretched film of thickness=137 μm, $R_0$=619 nm and $R_{40}/R_0$=1.112. The stretched film was cut into a size of 10 cm (direction perpendicular to stretching axis)×10 cm (stretching axis direction). The cut film was subjected to thermal relaxation at 158° C. for 4 minutes on the releasable films (Cerapeel Q-1 #188 manufactured by Toyo Metallizing Co., Ltd.). As a result, there was obtained a phase retarder film of size=10.1 cm (direction perpendicular to stretching axis)×9.65 cm (stretching axis direction), thickness=141 μm, $R_0$=415 nm, and $R_{40}/R_0$=1.118.

A Japanese Patent Application No. 03-324644 is hereby incorporated by reference.

Although the present invention has been described in detail, it should be understood that various changes, substitutions and alternations can be made hereto without departing from the spirit and scope of the present invention as defined by the appended claims.

What is claimed is:

1. A process for producing a phase retarder film or sheet, comprising the steps of subjecting a uniaxially stretched thermoplastic resin film or sheet to thermal relaxation at a temperature of at least the glass transition temperature of the thermoplastic resin to shrink the film or sheet in a stretching axis direction while suppressing expansion of the film or sheet in a direction parallel to the film or sheet surface and perpendicular to the stretching axis, wherein the thermal relaxation and expansion suppression are conducted until the retardation ratio of the film or sheet satisfies the following formula:

$$0.900 < R_{40}/R_0 < 1.100$$

where $R_{40}$ is the retardation value measured with the film or sheet tilted 40° from horizontal around an axis corresponding to the slow axis if the thermoplastic resin has a positive intrinsic birefringence or the fast axis if the thermoplastic resin has a negative intrinsic birefringence and $R_0$ is the retardation value measured with the film or sheet arranged horizontally.

2. A process according to claim 1, wherein the thermal relaxation is conducted while maintaining a constant length of the film or sheet in a direction parallel to the surface of the film or sheet and perpendicular to the stretching axis.

3. A process according to claim 1, wherein the thermal relaxation is conducted while applying pressure to the surface of the film or sheet in a direction perpendicular to the surface of the film or sheet.

4. A process according to claim 1, wherein the thermal relaxation is conducted while maintaining a constant length of the film or sheet in a direction parallel to the surface of the film or sheet and perpendicular to the stretching axis and applying pressure to the film or sheet in a direction perpendicular to the surface of the film or sheet.

5. A process according to claim 2, wherein the length of the film or sheet in a direction parallel to the surface of the film or sheet and perpendicular to the stretching axis is maintained constant by arranging the film or sheet in a frame wherein the film or sheet is not allowed to expand in a direction parallel to the surface of the film or sheet and perpendicular to the stretching axis of the film or sheet, thereby suppressing expansion of the film or sheet in the direction parallel to the surface of the film or sheet and perpendicular to the stretching axis.

6. A process according to claim 4, wherein the length of the film or sheet in a direction parallel to the surface of the film or sheet and perpendicular to the stretching axis is maintained constant by arranging the film or sheet in a frame wherein the film or sheet is not allowed to expand in a direction parallel to the surface of the film or sheet surface and perpendicular to the stretching axis of the film or sheet, thereby suppressing expansion of the film or sheet in the direction parallel to the surface of the film or sheet and perpendicular to the stretching axis.

7. A process according to claim 3, wherein the pressure is between 0.1 g/cm$^2$ to 10 Kg/cm$^2$.

8. A process according to claim 4, wherein the pressure is between 0.1 g/cm$^2$ to 10 Kg/cm$^2$.

9. A process according to claim 1, wherein the thermal relaxation is carried out at a temperature between the glass transition temperature of the thermoplastic resin and 50° C. higher than the glass transition temperature of the thermoplastic resin.

10. A process according to claim 1, wherein the thermoplastic resin has a positive intrinsic birefringence.

11. A process according to claim 10, wherein the thermoplastic resin is selected from the group consisting of a polycarbonate, a polysulfone, a polyacrylate, a polyethersulfone and cellulose diacetate.

12. A process according to claim 11, wherein the thermoplastic resin is a polycarbonate.

13. A process according to claim 1, wherein the thermoplastic resin has a negative intrinsic birefringence.

14. A process according to claim 13, wherein the thermoplastic resin is selected from the group consisting of a polystyrene, an α-methylpolystyrene, a polyvinylpyridine, a polyvinylnaphthalene and a polymethyl methacrylate.

* * * * *